US00RE36233E

United States Patent [19]

Hilker et al.

[11] E Patent Number: Re. 36,233

[45] Reissued Date of Patent: Jun. 22, 1999

[54] USE OF SOFTENING ADDITIVES IN POLYURETHANE FOAM

[75] Inventors: Brian L. Hilker, Windfield, W. Va.; Mark E. Harakal, Ridgefield, Conn.; Susan B. McVey, Charleston, W. Va.

[73] Assignee: OSi Specialties, Inc., Greenwich, Conn.

[21] Appl. No.: 09/086,816

[22] Filed: May 29, 1998

Related U.S. Patent Documents

Reissue of:

[64] Patent No.: 5,539,011
Issued: Jul. 23, 1996
Appl. No.: 08/326,293
Filed: Oct. 20, 1994

U.S. Applications:

[63] Continuation-in-part of application No. 08/101,189, Aug. 3, 1993, abandoned.

[51] Int. Cl.[6] ..... C08G 18/18

[52] U.S. Cl. ..... 521/163; 521/129; 521/137; 521/170; 521/174

[58] Field of Search ..... 521/137, 163, 521/170, 129, 174

[56] References Cited

U.S. PATENT DOCUMENTS

| | | | |
|---|---|---|---|
| 3,804,782 | 4/1974 | Demon et al. . | |
| 4,101,466 | 7/1978 | McEntire | 521/115 |
| 4,101,470 | 7/1978 | McEntire | 521/118 |
| 4,950,694 | 8/1990 | Hager | 521/167 |
| 5,034,426 | 7/1991 | Casey et al. | 521/163 |
| 5,084,486 | 1/1992 | Patten et al. | 521/170 |
| 5,364,852 | 11/1994 | Hinz | 521/163 |

FOREIGN PATENT DOCUMENTS

| | | |
|---|---|---|
| 0358282 | 3/1990 | European Pat. Off. . |
| 0429103 | 4/1990 | European Pat. Off. . |

OTHER PUBLICATIONS

Chemical Abstract CA89(2):7054s, Mar. 1978.
Chemical Abstract CA87(8): 54035e, May 1977.
Chemical Abstract CA86(22):156226q, Feb. 1977.
Chemical Abstract CA85(24):178515q, Sep. 1976.
Chemical Abstract CA81(14):78662j; May 1974.
Chemical Abstract CA76(20):114507v, Dec. 1971.
Chemical Abstract CA97(20):163689y, Aug. 1982.
Chemical Abstract CA96(18):143542w, Feb. 1982.
Chemical Abstract CA93(6):477732q, Mar. 1980.
Chemical Abstract CA92(18):147893b, Jan. 1980.
Chemical Abstract CA90(6):39598j, Sep. 1978.
Chemical Abstract CA118(12):104433, Sep. 1990.
Chemical Abstract CA117(10):91012d, Sep. 1990.
Chemical Abstract CA109(20):171790t, Oct. 1986.
Chemical Abstract CA105(10):79879m, Oct. 1984.
Chemical Abstract CA99(4):23488y, Sep. 1981.
Zellmer, V., et al., "New Aspects in the Production of Soft Flexible Polyurethane Foams Without Auxiliary Blowing Agents", Oct. 1989.
Vandichel, N. E., et. al., "Reduction of CFC–11 Usage in Flexible Polyurethane Foams through Modifications to Polymer Morphology", pp. 486–491, 30th Annual Polyurethane Technical Marketing Conference (Oct. 1990).
Shell Urethane Chemicals Technical Manual, UC 2.5.8, "Carapor 2001", UC3.1.12, Carapor 2001 in the Manufacture of Soft Flexible Slabstock Foams Sep. 1990.
Odian, G., "Principles of Polymerization" second edition, p. 128; Dec. 1981.
Malwitz, N., et. al., "Amine Catalysis of Polyurethane Foams", Polyurethane/Technical Marketing COnference, Oct. 1986, pp. 338–353.
Klemper, D. et. al., "Handbook of Polymeric Foams and Foam Technology" pp. 96–101; Dec. 1991.

*Primary Examiner*—John M. Cooney, Jr.
*Attorney, Agent, or Firm*—Edward K. Welch, II; Andrew S. Reiskind; Timothy X. Witkowski

[57] ABSTRACT

An amine softening additive is useful in softening all-water blown flexible polyurethane foam to achieve low IFD valves while retaining the other commercially necessary properties of the foam. The additives are tertiary amine polyisocyanate catalysts which contain at least one contiguous three carbon chain and should be added to the foam system at about 0.1 to 2.0 parts per hundred of polyol.

18 Claims, No Drawings

USE OF SOFTENING ADDITIVES IN POLYURETHANE FOAM

Matter enclosed in heavy brackets [ ] appears in the original patent but forms no part of this reissue specification; matter printed in italics indicates the additions made by reissue.

This application *is a Reissue of U.S. patent application Ser. No. 08/326,293, filed Oct. 20, 1994, now U.S. Pat. No. 5,539,011, which* is a continuation-in-part of U.S. patent application Ser. No. 08/101,189 filed on Aug. 3, 1993, now abandoned.

BACKGROUND OF THE INVENTION

Environmental pressures and ever-tightening governmental regulations have shifted the flexible slabstock polyurethane foam market away from the use of conventional blowing agents and auxiliary blowing agents (ABA's) such as CFC-11, methylene chloride, 1,1,1-trichloroethane, and methyl chloroform. Generally, this pressure has forced the polyurethane foam industry towards higher-water based formulations. The physical blowing of such high-water polyurethane foam formulations occurs from the carbon dioxide given off as a result or the reaction of water and isocyanate. This blowing replaces the traditional foam expansion derived from the volatilization of conventional blowing agents.

The shift to these higher-water formulations and away from conventional blowing agents has placed many additional demands on flexible slabstock foam production. First, the use of higher amounts of water typically results in increased foam exotherms leading to increased foam discoloration, scorching problems and potential for fire. Second, an increased urea content is common in higher water systems leading to higher hardness values. Thus, some softer foam grades are not readily attainable using only water as the sole blowing agent. Third, a dramatic decrease in foam quality as evidenced by key physical properties of the foam such as compression sets, tensile strengths, tear strengths, and elongation values are also common in most conventional higher water systems. These higher water systems also typically are more difficult to process than their conventional lower water counterparts.

These and related problems have generated several solutions to overcome the inherent pitfalls of current all-water-blown slabstock foam production technology. One of the primary chemical solutions to have evolved to date is the use of low index formulation technologies, such as described in U.S. Pat. No. 4,950,694 to Hager, which allow for lower exotherms and lower load (hardness or indentation force deflection [IFD]) values relative to conventional index, all-water-based systems. With such low index systems, many high quality, lower load foam grades can be produced without the environmentally harmful conventional and auxiliary blowing agents. However, it is desirable to achieve lower IFD ABA-free foams than can be achieved with these low index technologies, which typically are limited commercially to a minimum 25% IFD value (that is, the load at 25% compression of the foam in lbs. per 50 square inches) of about 19–22 lb. in lower density foam (<1.5 lbs./f$^3$) and greater than about 22 lb. in higher density (>1.5 lbs./f$^3$) foam, measured according to ASTM-3574.

On another note, the use of amine based isocyanate dimerization or trimerization catalysts has been known for use in manufacturing rigid polyurethane foams. These catalysts lead to isocyanurate linkages which are highly crosslinked and generate brittle, rigid foam structures. Thus, these catalysts have been used in rigid foams wherein, unlike flexible foam, high degrees of cross-linking are desirable. In particular, U.S. Pat. No. 3,804,782 teaches the general use of 1,3,5-tris-(3-dimethylaminopropyl)-1,3,5-triazine (CAS 15875-13-5) in rigid polyurethane foams. Many rigid foam systems have also included N,N-Dimethyl cyclohexylamine (CAS 98-94-2) as an early stage co-catalyst in catalyst blends intended to produce trimerized isocyanate structures in foams (WO9216574).

Additionally, U.S. Pat. No. 4,101,466 discloses the general use of bis-(3-dimethylaminopropyl) methlylamine (CAS 3855-32-1) in polyurethane foams and U.S. Pat. No. 5,173,516 teaches the use of bis-(3-dimethylaminopropyl) methylamine as a processing aid for high resiliency (HR) foam systems. The catalyst N,N-dimethylpiperazine (CAS 106-58-1) (DMP) has been used primarily as a processing aid in polyester foams, though one patent citation (U.S. Pat. No. 3,66 1,808) claims the use of N,N-dimethylpiperazine in a catalyst blend for the purpose or reducing the volatility of the catalyst mixture. Such processing is different from the physical enhancement of foam, e.g., an increase foam softness, because while it may increase the cure rate of the foam, the catalysts have not been known to soften the HR and polyester foams.

Moreover, German Patent No. 4030515 discloses the use of 3-(dimethylamino)-1-propylamine (DMAPA) (CAS 109-55-7) to prepare catalysis useful in rigid polycther polyol foams. This catalyst has also been used to catalyze HR foams according to the teachings of DE2116535.

SUMMARY OF THE INVENTION

The present invention describes a new additive to be used in concert with all-water blown low index flexible polyurethane technology as a means of dramatically softening the resultant foams. These additive based foams yield similar or better physical properties than the higher IFD (harder) foams without the additive.

Specifically, this invention relates to the use of certain tertiary amine catalysts to reduce the IFD values (hardness properties) of flexible polyurethane slabstock foam prepared using conventional secondary hydroxyl polyether polyols. More particularly, this invention relates to these amine softening additives used in all-water-based foam formulations, particularly those or low isocyanate index (<100). These foams exhibit a substantially open cell structure without crushing and without the use or any ABA's such as chlorofluorocarbons, methylene chloride, or other halocarbons.

DETAILED DESCRIPTION OF THE INVENTION

The present invention is based on the unexpected findings that small amounts or certain amine foam additives dramatically soften low density all-water based flexible polyurethane foams while maintaining the other desirable properties of the foam, e.g., small cell size, acceptable compression, etc. and without significantly affecting processability. Polyurethane foam formulations contemplated herein are typically all-water-blown low index formulations using stabilizing additives such as those discussed in U.S. Pat. No. 4,950,694 to Hager, which is incorporated herein by reference.

The amine additives for use herein are typically not used in conventional flexible slabstock foams. Most conventional secondary hydroxyl polyol based flexible slabstock foam amine catalyst packages rely heavily on blends of strong blowing and gelling catalysts such as bis (dimethylaminoethyl) ether and triethylenediamine (TEDA). The catalysts of this invention are relatively weak polyurethane catalysts in comparison and typically are used in rigid, molded, and/or high resiliency (HR) foams. Such catalysts have been used in rigid foams systems to promote isocyanate dimerization, trimerization, and (cyclo) trimerization as one method to help harden the foam systems or as HR molded or polyester based foam processing aids as means to control early stage foam exotherms and foam gelation as it relates to flow. Thus, that these catalysts producing a large softening affect in conventional flexible polyurethane foams, foams which typically require much stronger catalysts, is unexpected.

The amine additives of this invention yield foam with equal or superior processing and physical properties to all-water based polyurethane foams while exhibiting very large IFD reductions of the foams incorporating them. These properties have been mostly observed with low density, soft foam (about 1 pcf [pound per cubic foot]) grades. High quality foams with IFD reductions of up to about 9 lb. as compared to foams without the amine additive have been seen in these 1 pcf foams upon the addition of small quantities of the amine additives of the present invention. Similar additions or small quantities of these amine additives to high density (about 1.8 pcf), soft foam grade, all-water based formulations have shown IFD reductions approaching about 2.5 lbs. Thus, the additives may be described by their affect of producing a useful flexible foam with a 25% IFD of 5 to 18 lbs., preferably 10 to 18 lbs. in lower density (<1.5 pcf) foam and 10 to 21 lbs., preferably 16 to 21 lbs. in higher density (>1.5 pcf) foam. Moreover, 90% compression sets (measured according to ASTM 3574) of less than about 15% can be achieved with the present invention. Such magnitudes of IFD change with minor amounts of amine additives are surprising, especially given that some or these additives are used to harden rigid foam or are used mainly as processing aids.

Cell Size is another important property in foam. A fine or small-sized cell structure is generally accepted as leading to a silky feel or hand of a given piece of foam. Additionally, the relative degree of regularity of the cell sizes also strongly contributes to foam physical properties such as tingemailing and compression sets in many foam grades. Highly desirable maximum cell sizes of less than about 2.0 mm are achieved in the present by disclosed foam formulation.

Airflow data provides a numerical measure of the amount of air to flow through a standard size piece of foam at a standard air pressure and temperature. This gives a measure to the relative openness or closedness of a given piece of foam. Foams with higher airflows are more open and conversely those with lower airflows are considered closed or tighter. Airflows achieved in foams of the present invention are greater than about 80 cfm/ft$^2$ for 1.0 pcf foams and greater than about 30 cfm/ft$^2$ for higher density foam. Thus, the airflows of the presently disclosed foams are relatively high and indicate good quality open-celled foam. These airflow ranges are for non-FR (flame retardant) foam grades. FR foams would be, by definition, of lower airflows.

Blow times are an important property of foam disclosed herein due to the mechanical processing limitations associated with the standard foam production equipment used in the industry. Since most commercial slabstock foam is produced on continuous equipment, it is desirable to have foam formulation blowoff times within pre-described ranges that are optimal for a given machine. Outside of the normal blowoff time windows (i.e., 75–180 sec. on most equipment), the production or useful foam in a continuous, consistent manner is problematic as throughputs, fallplate settings and catalyst levels, become extremely difficult to optimize, thus inhibiting the production these foam systems. Blow times of most of the presently disclosed foam formulations are in the range of about 75–180 seconds and most preferably around 100–140 seconds and thus, fall within the commercially necessary parameters. A few of the disclosed formulations are slightly below this 75 second limit and yet are believed to be close enough to said limit that further optimizations of all of the formulation components should bring these into the range of commercially producable foam.

Although the mechanism of this softening by the amine additives is uncertain, it is believed to be catalytic in nature and to possibly be a function of the total formulation water as the higher density foams (less water) show a lesser degree of softening than do the lower density foams (with higher water levels).

Components of the Flexible Polyurethane Slabstock Foam

The flexible polyurethane slabstock foam contemplated herein is comprised of (I) one or more polyols; (II) one or more organic isocyanates; (III) blowing agents; (IV) one or more surface active agents; (V) one or more catalysts; (VI) one or more foam processing aids; (VII) amines softening additives; and (VIII) optionally, one or more of (VIII) other standard ingredients known to those skilled in the art. To follow is a description of each component of the invention.

Polyol

The polyols, Group (I), which can be utilized in the present invention include, but are not limited to, the following polyether polyols: (a) alkylene oxide adducts of polyhydroxyalkanes; (b) alkylene oxide adducts of non-reducing sugars and sugar derivatives; (c) alkylene oxide adducts of polyphenols; and (d) alkylene oxide adducts or polyamines and polyhydroxyamines. Alkylene oxides having two to four carbon atoms generally are employed, with propylene oxide, ethylene oxide and mixtures thereof being particularly preferred.

Any material having active hydrogens, as determined by the Zerewitinoff method, may be utilized to some extent and therefore is included within the broad definition of the polyols of Group (I). For example, amine-terminated polyether polyols, hydroxyl-terminated polybutadiene polyols and many others are known and may be used as a minor component in combination with the above-identified conventional polyether polyols.

Generally, the polyol compound (I) should have an equivalent weight in the range of about 400 to about 1500 grams/equivalent and an ethylene oxide content of less than 20%. Preferably the equivalent weight is in the range of about 500 to about 1300 grams/equivalent and most preferably between about 750 and 1250 grams/equivalent. The polyol or polyol blend should have an average hydroxy functionality of at least 2. The equivalent weight is determined from the measured hydroxyl number. The hydroxyl number is defined as the number of milligrams of potassium hydroxide required for the complete hydrolysis of the fully acetylated derivative prepared from one gram of polyol. The relationship between the hydroxyl number and equivalent weight is defined by the equation: OH =56,100/equivalent weight, where OH equals the hydroxyl number of the polyol. Thus, polyols have hydroxyl numbers preferably in the range of about 43 to about 110, and more preferably in the range of about 45 to about 75.

Preferably the polyols should include the poly (oxypropylene) and poly(oxyethylene-oxypropylene) triols.

Ethylene oxide, when used can be incorporated in any fashion along the polymer chain. Stated another ways the ethylene oxide can be incorporated either in internal blocks, as terminal blocks, or may be randomly distributed along the polyol chain. However, the manner of incorporation and the ethylene oxide content of the polyol preferably is as noted above. Thus, ethylene oxide is used at a level below about 20% by weight, preferably below about 15% by weight, and is located primarily within the interior of the polyol chain. Thus, preferably the polyols are substantially secondary hydroxyls.

Preferably, a portion or all of the polyol component may be added in the form of a polyol polymer in which reactive monomers have been polymerized within a polyol to form a stable dispersion of the polymer solids within the polyol.

The amount of polyol used is determined by the amount of product to be produced. Such amounts may be readily determined by one skilled in the art.

Isocyanates

Organic isocyanates (Group II) useful in producing polyurethane foam in accordance with this invention are organic compounds that contain, on average, between about one and a half and about six isocyanate groups, and preferably about two isocyanate groups. Suitable organic polyisocyanates include the hydrocarbon diisocyanates, e.g., the alkylene diisocyanates and the aryl diisocyanates and more specifically, diphenylmethane diisocyanate and toluene diisocyanate ("TDI"). Preferred polyisocyanates are 2, 4 and 2, 6 toluene diisocyanates and their mixtures having a functionality of about 2, which are broadly referred to herein simply as TDI. The most preferred polyisocyanate is 80/20 TDI (i.e., a mixture of 80% 2,4-toluene diisocyanate and 20% 2,6-toluene diisocyanate).

The amount of isocyanate to be used is dependent upon the index of foam desired and the final properties of the foam to be formed. As stated above, if the index is 100, then there is a stoichiometric equivalent of the amount of isocyanate needed to react with the polyol component (Group I) and the other active hydrogen containing components in the system. While the present invention may be practiced in a wide range of indexes, 60–120; however, the preferred range of use is indexes between 80 and 115; and most preferably the range of indexes is 85–95.

Blowing Agents

Water (Component III) is preferably the sole blowing agent to produce carbon dioxide by reaction with isocyanate. Water should be used at about 1 to 12 pphp (parts per hundred of polyol (Group I)) and preferably between 2 and 10 pphp. At foam indexes below 100, the stoichiometric excess of water cools and blows via vaporization, not as part of the reaction to produce carbon dioxide. Other blowing agents that are conventionally used in the art may be used herein, but because of the utility of the formulation large amounts of such agents are no longer needed and in many cases none are needed at all.

Surface Active Agents

Suitable surface active agents (Group IV) (also known as surfactants) for slabstock applications include "hydrolyzable" polysiloxane-polyoxyalkylene block copolymers. Another useful class of foam surface active agents are the "non-hydrolyzable" polysiloxane-polyoxyalkylene block copolymers. The latter class of copolymers differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. Most preferred are the silicone surfactants L-640, L-620 and L-603 commercially available from OSi Specialties, Inc. of Danbury, Conn. The surface active agent should be present at about 0.0001 percent to about 7–8 percent by weight of the total reaction mixture.

Catalysts component (v) is a combination of standard tertiary amine and organometallic polyurethane catalysts which should be present at about 0.0001 to 5 weight percent of the reaction mixture. Suitable catalysts include, but are not limited to, dialkyltin salts of carboxylic acid, tin salts of organic acids, triethylene diamine (TEDA), bis (2,2'-dimethylaminoethyl) ether and similar compounds that are well known to the art.

Foam Processing Aid

A foam processing aid (Group VI) is used for enhancing the properties of low density, flexible slabstock foam, said foam processing aid includes a crosslinking agent and/or extending agent and preferably a sufficient amount of a cell opening agent, to yield a polyurethane foam having a porosity greater than about 40 cubic feet per minute per square foot (CFM-ft$^2$), although this is dependent on foam grade.

A relatively low molecular weight (generally below about 250 gms/mole) polyfunctional glycol crosslinking/extending agent is preferred to make stable, free-rise foams. The equivalent weights of these agents are generally less than about 200, but in certain circumstances they may be higher. The reactive group functionality of these compounds should be at least two, and preferably in a mixture of agents, at least one has a functionality or three or greater. Polyfunctional isocyanate reactive compounds, such as a hexahydroxy functional alkane of a molecular weight or approximately 182 gms/mole with an equivalent weight of 30, are preferred. The number of such functionalities may be greater than the limitation of eight. The polyols that are or use herein, unlike those previously described, may include primary polyols.

The crosslinking/extending agent should be present between about 0.1 and 10 pphp and preferably, between 0.2 and 5 pphp.

Other polyfunctional isocyanate reactive components may be used with the present invention. These include, other high molecular weight cross-linking agents that are polyvinyl alcohol homo- and copolymers of numerous monomers, including polyvinyl butyral, which has a molecular weight of 2,000–20,000, hydroxyethyl(meth)acrylate homo- and co-polymers of molecular weight 2,000–20,000, hydroxyl derivatives or polyvinyl ethers such as hydroxybutyl vinyl ether homo- and co-polymers of molecular weight 2,000–20,000 and similar polymers. These polymers may have equivalent weights greater than 200 which may be preferred in certain usages. Generally, the equivalent weight is between 50 and than 2,000. Moreover, the molecular weight of these polymers are from 2,000 to 20,000.

The cell opening agent, is preferably a polyethylene oxide monol or polyol of an equivalent weight greater than 200, with 200–1,000 being preferable, with a hydroxyl functionality of two or greater. For example, one of the preferred cell opening agents is a polyethylene oxide adduct of glycerol of a molecular weight or about 990 gms/mole, with an equivalent weight of about 330. The cell opening agent should be present at about 0.001 to 20 pphp. Note that in certain cases despite the equivalent weight difference, the cell opener may act as a crosslinking agent and vice-versa, thereby reducing the need for the crosslinking agent or cell opening agent, as the case may be.

The weight ratio of the cell opening agent to crosslinking agent present in the composition is critical and should be about 10:1 to 1:2, with 6:1 to 3:1 being preferable. Combinations of cell opening agent and crosslinking agent within this preferred range have a symbiotic effect on the foam. For example, when a cross-linking agent was used alone, foams were stable with no splits, but were tight with low air flow resulting in poor compression sets. If a cell opening agent is used alone the foam will be very open with center splits and possessed moderate compression sets at best. In the preferred range of ratios, combinations lead to spilt-free, stable open foams with low compression sets.

It has been observed that certain of the amine softening additives behave quite differently in the presence of different cell openers, crosslinking/extending agents, or differing ratios of the two. The IFD property of foam is very dependent on these components and ratios. Changing the cell openers, crosslinking/extending agents, the ratio of these two components, and/or the amine softening additives will result in vastly different foam performance and/or property characteristics. This will require optimization of the foam formulation toward the desired physical properties of the resultant foams using these component mixtures. Such optimizations of other foam components will be clear to one skilled in the art. For example, when using the 990 gm/mole cell opener versus the 550 gms/mole cell opener, additional tin and/or amine may be required for the production of foam of similar processability.

Amine Additives

The specific softening amine additives (VII) of this invention are tertiary amino polyisocyanate catalysts which contain at least one contiguous three (3) carbon chain, which is not interrupted by a non-carbon atom. Said polyisocyanate catalysts may be polyisocyanurate catalysts which cause crosslinking amongst the isocyanate groups. These catalysts also include some polyester foam and HR foam processing aids. These types of catalysts are well known in the art and the type of structures included therein have been known in the art. See, e.g., Malwitz, N. et. al., "Amine Catalysis of Polyurethane Foams," 30th Annual Polyurethane Technical/Marketing Conference, 338, 345 (1986), which is incorporated herein. The primary prior use of said catalysts has been to harden rigid polyurethane foam. Moreover, these catalysts have been used to aid rigid HR and polyester foams with processing.

Exemplary for use herein are 1,3,5-tris-(3-dimethylaminopropyl)- 1,3,5-triazine (commercially available from OSi Specialties, Inc. of Danbury, Conn. under the trade name NIAX® C-41) and bis-(3-dimethylaminopropyl) methylamine (commercially available from Air Products of Allentown, Pa. under the trade name POLYCAT® 77). Other examples for use herein include 1, 4, Dimethylpiperazine (DMP) and dimethyl cyclohexyl amine (NIAX® C-8 available from OSi Specialties, Inc.). The choice of the particular additive depends upon the cell opener and crosslinking agent used in the composition.

These amine softening additives or additive blends are used in relatively small amounts 0.1 to about 2 pphp, in addition to normal tin and amine catalyst.

Other Additives

Solid stabilizing polymers (VIII) and other additives, including flame retardants, colorants, dyes and anti-static agents, which are conventionally known in the art may be used with the formulations of the present invention. Those additives listed in U.S. Pat. No. 4,950,694 are exemplary and are incorporated herein. Of particular note are additives such as JEFFAMINE® amine terminated polyols (available from Texaco of Houston, Tex.) and more specifically, ethylene oxide, propylene oxide based block copolymers which are terminated with a primary amine.

Process

Initially, the required amount of toluene di-isocyanate (TDI) is calculated from the amount of polyol, water, foam processing aid and the desired index. The polyol, surface active agent, amine catalyst, amine additive, water, foam processing aids, and other additives are mixed together and agitated. During such agitation, the organometallic catalyst and the isocyanate are added and mixing continues until homogeneous. When the mixing stops, the liquid foam mass is poured as quickly as possible into the desired form for the foam. Frequently, this is accomplished in a continuous process. After gas release starts occurring, the foam may be mechanically cooled.

EXAMPLES

The following examples which indicate the utility of the present invention, but are not intended to limit the scope thereof, use the following designations, terms, and abbreviations:

Polyol designates a 56 hydroxyl number polyalkylene triol (nominal) produced by reacting propylene oxide (90%) and ethylene oxide (10%) onto glycerin. This material has predominantly secondary terminal hydroxyl groups.

Water indicates distilled water.

TDI designates commercially available 80/20 mix of toluene diisocyanate isomers.

Tin designates a standard commercial organotin catalyst. T-9, consisting mainly of stannous octoate.

Amine designates a balanced blow and gel catalyst, typically NIAX® catalyst C-183 (available from OSi Specialties, Inc.).

Silicone designates a standard commercial non-hydrolyzable surfactant (polyether-silicone copolymer) used for conventional slabstock foam, Silicone L-620, available from OSi Specialties, Inc.

Modifier 1 designates Geolite® modifier GM-201 foam processing aid which contains 25% of water (commercially available from OSi Specialties, Inc.)

Modifier 2 designates Geolite® modifier GM-205 which contains foam processing aid which contains 28% water. (Commercially available from OSi Specialties, Inc.)

Modifier 3 comprises about 25% by weight, of water, about 64% polyethylene oxide adduct of glycerol of a molecular weight of about 990 gms/mole, with an equivalent weight of about 330, and about 11% hexahydroxy functional alkane of a molecular weight of about 182 gms/mole with an equivalent weight of about 30.

Additive A designates ORTEGOL® 310 softening agent. (Available from Th. Goldschmidt of Hopewell, Va.)

Additive B is Carapor 2001 softening agent. (Available from Shell of Houston, Tex.)

Additive C is NIAX® C-41 catalyst. (Available from OSi Specialties, Inc.)

Additive D is POLYCAT® 77 catalyst. (Available from Air Products.)

Additive E is NIAX® C-8 catalyst. (Available from OSi Specialties, Inc.)

Additive F is JEFFAMINE® ED-600 polyol. (Available from Texaco.)

Additive G is 1,4-dimethylpiperazine. (Available from Aldrich of Milwaukee, Wis.)

Additive H is dirnethylaminopropylamine. (Available from Aldrich.)

Additive I is NIAX® catalyst A-1. (Available from OSi Specialties, Inc.)

Additive J is NIAX® catalyst A-33. (Available from OSi Specialties, Inc.)

Additive K is 3-Dimethylamino-N,N-dimethylpropionamide. (Available from Aldrich)

Additive L is ARMEEN® DM-16D catalyst. (Available from Akzo of Chicago. Ill.)

Additive M is NIAX® C-5 catalyst. (Available from OSi Specialties, Inc.)

Additive N is tetramethyl-1,3-butanediamine. (Available from OSi Specialties, Inc.)

Additive O is tetramethyl-1,3-ethylenediamine. (Available from Aldrich.)

Foam Physical Properties

Splits indicates visible evidence and degree of splitting. This may appear as a surface or interior foam split. A relative measure of severity may proceed this descriptor.

Cell Size indicates an actual measure of averaged cell size ranges using a hand-held magnifying eyepiece with internal metric ruler.

% Settling indicates the percentage of foam height reduction at aborn the 4 minute post pour time relative to the maximum foam height during the first 3 minutes of foam rise.

Fingernailing is a subjective industry test which involves pressing the tingemails deeply into the foam sample and visually judging the speed at which the foam recovers. Fast recovery is desirable and is designated by adjectives such as good or mild fingernailing. Fingernailing should be moderate to mild, though mild to non-existent is most preferred. All other physical property testing of foam samples were performed according to ASTM D-3574 with minor modifications.

Lab Foam Production Methods

All of the all-water blown flexible foams were prepared using standard, box pour, hand mixture methods as described below. The polyol was weighed into a half gallon paper mixing cup, followed by surfactant, amine(s), additive (s), and lastly the distilled water. This mixture was thoroughly agitated for 60 or more seconds using a drill press based blade mixing system (at 2500 RPM) which was attached to the pre-programmed timer. The drill press stopped for 15 seconds after the initial mixing period (according to a pre-programmed schedule) in which time the pre-weighed amount of tin catalyst was added via syringe. The mixing then restarted and continued for 9 more seconds. At this time, a pre-measured aliquot of TDI was added in one quick addition with continued stirring followed by additional mixing for 6 seconds. When the drill press stopped, the liquid foam mass was poured as quickly as possible into a cardboard box (14"×14"×6"). The blow off time was measured as the time period from the initial TDI addition until gas release occurs. The gas release was recognized as bubbles appearing across the surface of the foam. A sonar unit was used to measure foam heights for up to 5 minutes after initial mixing. The final foam rise and the percentage settle of the foam were recorded after the foam blow off time. Compression sets and other physical properties were measured according to ASTM 3574.

Comparative Examples A–H

The following two tables show the foam formulations and representative physical properties of all-water based foams prepared using commercially available softening additives in low index, all-water-based formulations. These are shown as Comparative Examples B–H versus a low index, all-water-based flexible foam without any additives (Comparative Example A).

As these data show, foams using Additive A revealed very small IFD reductions versus Comparative Example A, the base case, while yielding higher 90% compression sets and fingernailing properties. Foams prepared with Additive B showed significant IFD reductions, but also unacceptable compression sets and tingemailing properties. Hence, these illustrate the problems present in the art before the present invention.

Formulations of Comparative Commercial Additive Foams

| Chemical Components of Foam Formulations | Example A Formulation | Comparative Examples B–H |
|---|---|---|
| Polyol | 100 | 100 |
| Water (added) | 5.25 | 5.25 |
| TDI-80 | 64.38 | 64.84–66.67* |
| Index | 85 | 85 |
| Tin | 0.1 | 0.1 |
| Amine | 0.18 | 0.18 |
| Silicone | 1.0 | 1.0 |
| Modifier 1 | 5.0 | 5.0 |
| Additive A | — | 0.0–0.5 |
| Additive B | — | 0.0–0.5 |

*depending on the reported hydroxyl numbers of the additives

Physical properties of Comparative Commercial Additive Foams

| Foam Designation | Additive | Additive amt. pphp | blow time, sec | max. cell size, mm | Density, pcf | 25% IFD lb. | comp. sets (%) | Air Flow, (AF) cfm/sf | Degree of Finger-nailing |
|---|---|---|---|---|---|---|---|---|---|
| A | none | ' | 122 | 1.2 | 1.1 | 21.5 | 8.1 | 116 | mild-moderate |
| B | A | 0.1 | 126 | 1.4 | 1.1 | 21.0 | 36.2 | 140 | moderate to server |
| C | A** | 0.25 | 126 | 1.0 | 1.1 | 19.3 | 66.0 | 158 | moderate |
| D | A | 0.5 | 131 | 1.0 | 1.1 | 19.8 | 86.6 | 3 | severe |
| E | B | 0.1 | 124 | 1.5 | 1.1 | 18.5 | 40.0 | 126 | moderate |
| F* | B | 0.1 | 131 | 1.4 | 1.0 | 18.1 | 76.1 | 129 | moderate to severe |
| G | B*** | 0.25 | 131 | 1.4 | 1.1 | 15.0 | 88.3 | 4 | severe |
| H | B | 0.5 | 142 | 1.4 | 1.0 | 8.7 | 89.7 | 21 | severe |

repeat of comparative example E. A + B do not fall within the scope of invention

**9.4% settling

-continued

Physical properties of Comparative Commercial Additive Foams

| Foam Designation | Additive | Additive amt. pphp | blow time, sec | max. cell size, mm | Density, pcf | 25% IFD lb. | comp. sets (%) | Air Flow, (AF) cfm/sf | Degree of Finger-nailing |
|---|---|---|---|---|---|---|---|---|---|

***6.1% settling.
All other foams ≦ 2% settling.

Examples 1–11 and Comparative Examples A, I–R

The following two tables show the foam formulations and representative physical properties of various flexible polyurethane foams prepared using the amine softening additives and additive blends of the present invention. These foams are low index, all-water-based formulations Examples 1–11 are made according to the present invention. Comparative Examples A, I–R are shown for contrast to these examples. Example A is the same as in the previous set of examples.

These foams show that additives C, D, E, G, and H alone or in combination with other additives yield lower IFD foams (versus the foams of the present invention) with similar compression sets. The Comparative Examples I–R typically show little or no softening in most cases using comparable levels of these amino additives of the present invention. When softening does occur with these comparative examples, as Example M, the compression sets are found to unacceptably high.

| Chemical Components of Foam Formulations | Comparative Example A | Comparative Examples 1–R |
|---|---|---|
| Polyol | 100 | 100 |
| Water (added) | 5.25 | 5.25 |
| TDI-80 | 64.38 | 64.38 |
| Index | 85 | 85 |
| Tin | 0.1 | 0.1–0.13* |
| Amine | 0.18 | 0.0–0.18* |
| Silicone | 1.0 | 1.0 |
| Modifier 1 | 5.0 | 5.0 |
| Additive C | — | 0.0–0.30 |
| Additive D | — | 0.0–0.25 |
| Additive E | — | 0.0—0.38 |
| Additive F | — | 0.0–0.5 |
| Additives G–O | — | 0.0–0.15 |

*The catalyst levels of these formulations were slightly modified from foam to foam to produce testable, split-free foam with the individual additives.

Formulations of Invention and Comparative Commercial Additive Foams

Examples 1–11 and

Physical Properties of Additive Foams

| Foam Designation | Additive | Add. amt. pphp | blow time, sec | max. cell size, mm | Dens., pcf | 25% IFD lb. | 90% comp. sets (%) | AF cfm/sf | Degree of Finger-nailing | Comments |
|---|---|---|---|---|---|---|---|---|---|---|
| 1 | D | 0.15 | 114 | 1.2 | 1.1 | 15.6 | 11.4 | 126 | mild. | improved hand |
| 2 | D | 0.25 | 99 | 1.0 | 1.1 | 16.7 | 11.5 | 115 | mild-moderate | improved hand |
| 3 | E | 0.15 | 125 | 1.4 | 1.1 | 17.8 | 9.6 | 112 | moderate-severe- | |
| 4 | E with F | 0.38 0.50 | 95 | 1.3 | 1.0 | 12.9 | 12.0 | 81 | moderate | improved hand |
| 5 | E with F | 0.15 0.5 | 121 | 1.1 | 1.1 | 18.5 | 13.8 | 175 | mild-moderate | |
| 6 | E with C | 0.10 0.15 | 100 | 1.1 | 1.0 | 13.8 | 23.0 | 109 | mild-moderate | |
| 7 | D with F | 0.25 0.5 | 101 | 1.3 | 1.0 | 15.1 | 11.8 | 152 | mild-moderate | |
| 8 | C with F | 0.15 0.5 | 109 | 0.9 | 1.0 | 16.1 | 14.2 | 218 | mild-moderate | |
| 9 | C | 0.3 | 93 | 1.2 | 1.0 | 14.4 | 12.9 | 179 | mild-moderate | |
| 10 | G | 0.15 | 110 | 1.5 | 1.1 | 18.5 | 14.3 | 121 | moderate | |
| 11 | H | 0.15 | 95 | 2.1 | 1.0 | 19.4 | 13.0 | 89 | mild-moderate | |
| Comparative Examples | | | | | | | | | | |
| A | none | — | 1.22 | 1.2 | 1.1 | 21.5 | 81 | 116 | mild-moderate | |
| I | F | 0.5 | 128 | 1.2 | 1.0 | 21.7 | 15.0 | 149 | mild-moderate | |
| J | B with F | 0.25 0.5 | 118 | 1.4 | 1.1 | 15.2 | 84 | 8 | moderate-severe | |

-continued

Physical Properties of Additive Foams

| Foam Designation | Additive | Add. amt. pphp | blow time, sec | max. cell size, mm | Dens., pcf | 25% IFD lb. | 90% comp. sets (%) | AF cfm/sf | Degree of Finger-nailing | Comments |
|---|---|---|---|---|---|---|---|---|---|---|
| K | A with F | 0.25 0.5 | 116 | 1.0 | 1.0 | 18.0 | 22 | 145 | mild-moderate | |
| L | I | 0.15 | 84 | 2.0 | 1.0 | 22.5 | 29.5 | 87 | moderate | |
| M | J | 0.15 | 116 | 2.0 | 1.0 | 17.8 | 42 | 108 | moderate | |
| N | K | 0.15 | 95 | 2.0 | 1.0 | 21.5 | 27.8 | 115 | moderate | |
| O | L | 0.15 | 113 | 1.8 | 1.1 | 21.0 | 14.8 | 167 | mild-moderate | |
| P | M | 0.15 | 92 | 2.0 | 1.0 | 18.5 | 73.3 | 69 | moderate | |
| Q | N | 0.15 | 94 | 2.2 | 1.0 | 19.5 | 61.9 | 89 | moderate | |
| R | O | 0.15 | 103 | 1.8 | 1.0 | 20.5 | 37.8 | 88 | moderate | |

Examples 12–13 and Comparative Example S

The following two tables show the foam formulations and representative physical properties of various low index all-water blown foams prepared using the softening amine additives and additive blends disclosed in the present invention. These are shown as Examples 12–13 versus a low index, all-water-based foam formulation. Comparative Example S, to highlight the effect of foam density on foam properties.

These foams show that up to about 2.4 lb. of IFD reduction in high density foam, versus the high density Example S, was observed using the amino additives of the present invention.

Formulations of Higher Density Invention Additive Foams

| Chemical Components of Foam Formulations | Comparative Example S | Examples 12–13 |
|---|---|---|
| Polyol | 100 | 100 |
| Water (added) | 2.65 | 2.65 |
| TDI-80 | 39.68 | 39.68 |
| Index | 85 | 85 |
| Tin | 0.13 | 0.19 |
| Amine | 0.22 | 0.22 |
| Silicone | 1.3 | 1.3 |
| Modifier 1 | 3.0 | 3.0 |
| Additive D | — | 0.0–0.15 |
| Additive C | — | 0.0–0.15 |

Physical properties of High Density, Invention Additive Foams

| | Additive | Additive amt. pphp | blow time, sec | 25% IFD lb. | 90% comp. sets (%) | Air Flow, (AF) cfm/sf |
|---|---|---|---|---|---|---|
| Comparative S | none | — | 145 | 21.5 | 9.3 | 51.3 |
| 12 | D | 0.15 | 102 | 20.0 | 5.8 | 34.2 |
| 13 | C | 0.15 | 111 | 19.1 | 9.0 | 43.1 |

All foams ≦3.0% settling.

Examples 14–16 and Comparative Example T

The following two tables show that the use of different modifiers with the amine softening additives can result in even lower IFD values than the previous examples using Modifier 1. In these tables, Examples 14–16 yielded IFD values or around 8–9 lbs. In comparison, Example 9 using Additive C and Modifier 1 yielded a 12.9 lbs. IFD value. Most other physical properties of these foams were similar.

Formulations Using Modifiers With Different Ratios of Cell Openers to Crosslinking/Extending agent.

| Chemical Components of Foam Formulation | Comparative Example T | Example 14 | Example 15 | Example 16 |
|---|---|---|---|---|
| Polyol | 100 | 100 | 100 | 100 |
| Water (added) | 5.1 | 5.1 | 5.25 | 5.25 |
| TDI-80 | 65.9 | 65.9 | 65.1 | 65.1 |
| Index | 88 | 88 | 88 | 88 |
| Tin | 0.18 | 0.25 | 0.28 | 0.28 |
| Silicone | 1.3 | 1.3 | 1.3 | 1.3 |
| Amine | 0.35 | 0.25 | 0.25 | 0 |
| Modifier 2 | 5.0 | 5.0 | 0 | 0 |
| Modifier 3 | 0 | 0 | 5 | 5 |
| Additive C | 0 | 0.4 | 0.4 | 0.4 |

Physical Properties of Invention Additive Foams

| | Additive | Additive amt., pphp | Blow time, sec. | Density, pcf | 25% IFD, lbs | 50% Comp. Sets (%) | Airflow (cfm/sf) | Finger-nailing |
|---|---|---|---|---|---|---|---|---|
| Comparative T | None | 0 | 90 | 1.05 | 22.3 | 15 | 65 | mild |
| Example 14* | Additive C | 0.4 | 63 | 1.06 | 8.7 | 6 | 114 | very mild |
| Example 15 | Additive C | 0.4 | 56 | 1.04 | 8.99 | 9 | 80 | very mild |

-continued

Physical Properties of Invention Additive Foams

| | Additive | Additive amt., pphp | Blow time, sec. | Density, pcf | 25% IFD, lbs | 50% Comp. Sets (%) | Airflow (cfm/sf) | Finger-nailing |
|---|---|---|---|---|---|---|---|---|
| Example 16 | Additive C | 0.4 | 64 | 1.03 | 9.62 | 7 | 95 | very mild |

*very minor splits observed

We claim:

1. A flexible slabstock polyurethane foam having a density of less than 1.5 pcf comprising *the reaction product of mixing together*:

a. a polyol with substantially all secondary hydroxyl functionality having an equivalent weight of about 400 to 1500 grams/equivalent and an ethylene oxide content of less than 20%;

b. an organic isocyanate present at an index of 60–120;

c. water at 1 to 12 pphp;

d. a surface active agent at 0.0001 to 5 weight percent;

e. a polyurethane catalyst at 0.0001 to 5 weight percent;

f. a foam processing aid at 0.2 to 10 pphp; and g. a tertiary amine polyisocyanate softening agent with at least one contiguous three carbon chain at 0.1 to 2 pphp;

wherein the foam has a 25% IFD of 5 to 18 pounds.

2. A foam according to claim 1 wherein the tertiary amine polyisocyanate softening agent is 1,3,5-tris-(3-dimethylaminopropyl)-1,3,5-triazine.

3. A foam according to claim 1 wherein the tertiary amine polyisocyanate softening is bis-(3-dimethylaminopropyl) methylamine.

4. A foam according to claim 1 additionally comprising ethylene oxide, propylene oxide based block copolymers which are terminated with a primary amine.

5. A foam according to claim 1 wherein the foam processing is comprised of a crosslinking/extending agent and a cell opening agent.

6. A foam according to claim 5, wherein the cell opening agent is a polyethylene oxide adduct of glycerol of a molecular weight of about 990 gms/mole, with an equivalent weight of about 330.

7. A process for making flexible slabstock polyurethane foam having a density of less than 1.5 pcf comprising mixing:

a. a polyol with substantially all secondary hydroxyl functionality having an equivalent weight of about 400 to 1500 grams/equivalent and an ethylene oxide content of less than 20%;

b. an organic isocyanate present at an index of 60–120;

c. water at 1 to 12 pphp;

d. a surface active agent at 0.0001 to 5 weight percent;

e. a polyurethane catalyst at 0.0001 to 5 weight percent;

f. a foam processing aid at 0.2 to 10 pphp; and g. a tertiary amino polyisocyanate softening agent with at least one contiguous three carbon chain at 0.1 to 2 pphp such that the foam has a 25% IFD of 5 to 18 pounds.

8. A process according to claim 7 wherein the tertiary amine polyisocyanate catalyst is 1,3,5-tris-(3-dimethylaminopropyl)-1,3,5-triazine.

9. A process according to claim 7 wherein the polyisocyanate catalyst is bis-(3dimethylaminopropyl)methylamine.

10. A process according to claim 7 additionally comprising ethylene oxide, propylene oxide based block copolymers which are terminated with a primary amine.

11. A process according to claim 7 wherein the foam processing is comprised of a crosslinking/extending agent and a cell opening agent.

12. A process according to claim 11, wherein the cell opening agent is a polyethylene oxide adduct of glycerol of a molecular weight of about 990 gms/mole, with an equivalent weight of about 330.

13. A polyurethane foam according to claim 1 wherein the the tertiary amine polyisocyanate softening agent is dimethylcyclohexyl amine.

14. A method according to claim 7 wherein the the tertiary amine polyisocyanate softening agent is dimethylcyclohexyl amine.

15. A flexible slabstock polyurethane foam having a density of less than 1.5 pcf comprising *the reaction product of mixing together*:

a. a polyol with substantially all secondary hydroxyl functionality having an equivalent weight of about 400 to 1500 grams/equivalent and an ethylene oxide content of less than 20%;

b. an organic isocyanate present at an index of 60–120;

c. water at 1 to 12 pphp;

d. a surface active agent at 0.0001 to 5 weight percent;

e. a polyurethane catalyst at 0.0001 to 5 weight percent;

f. a foam processing aid at 0.2 to 10 pphp; and g. a tertiary amine polyisocyanate softening agent with at least one contiguous three carbon chain at 0.1 to 2 pphp;

wherein the foam has a 25% IFD of 10 to 21 pounds.

16. A foam according to claim 15 wherein the tertiary amine polyisocyanate softening agent is 1,3,5-tris-(3-dimethylammopropyl)-1,3,5-triazine.

17. A foam according to claim 15 wherein the tertiary amine polyisocyanate softening agent is bis-(3-dimethylaminopropyl)methylamine.

18. A polyurethane foam according to claim 15 wherein the the tertiary amine polyisocyanate softening agent is dimethylcyclohexyl amine.

* * * * *